Aug. 24, 1937.   D. H. CRALL   2,091,138
PUMPING VALVE ASSEMBLY
Filed Dec. 30, 1936

INVENTOR
Donald Harmon Crall
BY
Geo. L. Parkhurst
ATTORNEY

Patented Aug. 24, 1937

2,091,138

UNITED STATES PATENT OFFICE 2,091,138

PUMPING VALVE ASSEMBLY

Donald Harmon Crall, Tulsa, Okla., assignor to Stanolind Oil and Gas Company, Tulsa, Okla., a corporation of Delaware Application December 30, 1936, Serial No. 118,316

4 Claims. (Cl. 251—121)

This invention relates to pumping valve assemblies such as are used in the conventional type of pump operating at the bottom of an oil well or other well.

The conventional pumping unit used in the production end of the oil industry has as its principal parts a cylindrical tube known as a working barrel, one or more valve assemblies near the bottom of this working barrel known as bottom valves or standing valves and one or more valve assemblies moving in the working barrel, actuated from the top of the well by valve rods, and known as upper valves, top valves or working valves. My invention can be used in connection with either or both of these types of valve assemblies and also has other uses.

A common type of valve assembly heretofore used has a steel ball, a seat disposed beneath the ball and ground to fit it and a valve cage within which the ball moves. When the pump rods are raised the pressure above the lower valve assembly is decreased and the ball valve member of the lower valve assembly rises within its valve cage. The working barrel then fills with fluid. When the rods descend, the upper ball rises within its valve cage and the fluid passes out of the working barrel into the flow line. Thus both ball valve members rise and fall within their valve cages with each stroke of the pump. Much difficulty has been encountered with the wearing of the valve cages and the chattering, spinning and pounding of the balls. This condition is particularly aggravated when gas is produced along with the oil as is usually the case.

One method which has been used in an attempt to solve this difficulty is to replace the ball valve member with a cylindrical valve member or "drop", working within a guide and ground at the lower end to fit the seat. Such a valve member is relatively free from the difficulties mentioned but is inferior to a ball valve member since it does not have the same self-seating characteristics.

It is an object of my invention to combine the advantages and eliminate the disadvantages of the ball type valve member on the one hand and the cylindrical type valve member on the other hand. It is a further object of my invention to produce a pumping valve assembly using a ball valve member which is free from chattering, pounding and spinning. Other and more detailed objects of my invention will become apparent as the description thereof proceeds.

A preferred embodiment of my invention is shown in the accompanying drawing which forms a part of this specification and in which.

Figure 1:
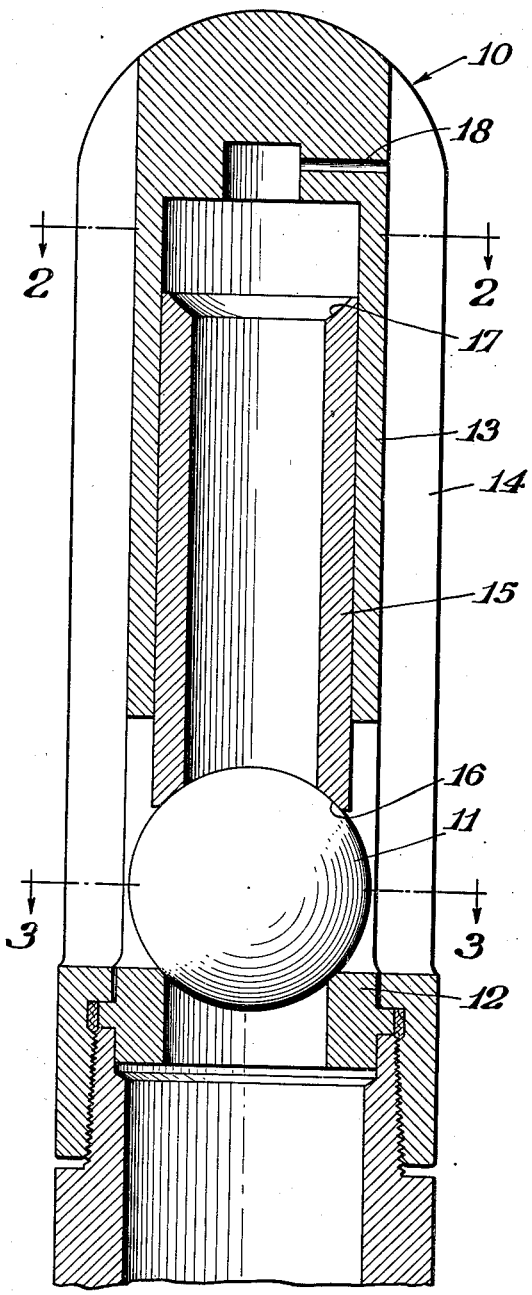
Figure 1 is an elevation (in section except for the ball valve member) of a pumping valve assembly.
Figure 2:
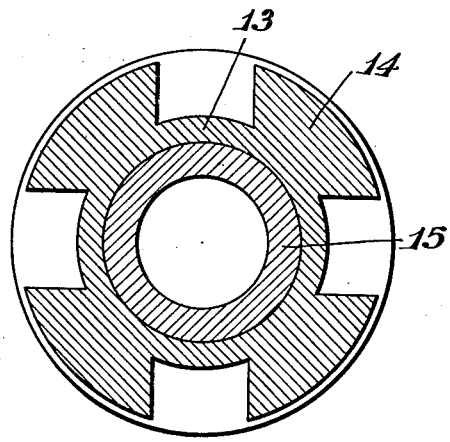
Figure 2 is a horizontal cross section taken along the line 2—2 of Figure 1.
Figure 3:
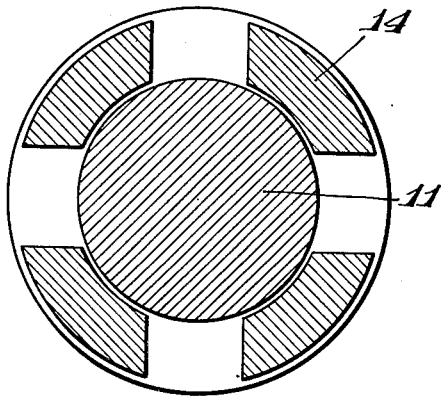
Figure 3 is a horizontal cross section taken along the line 3—3 of Figure 1.

Referring more particularly to the drawing, a valve assembly 10 comprises a hardened steel ball valve member 11, a hardened steel removable seat 12 for the ball valve member, a valve cage 13 surrounding and extending above the ball valve member, having wings or reins 14 about the ball valve member, and a cylindrical tube 15 disposed within the valve cage above the ball valve member. The cylindrical tube, which may suitably be made of bronze to avoid magnetic effects due to lodestone, is ground at the bottom 16 to fit the top of the ball. It is desirable to grind the tube similarly at the top 17 so that it will be reversible.

Previous structures have lacked the cylindrical tube 15. The result has been that the ball valve member 11 is thrown against the wings or reins 14, during the pumping operation and causes gradually increasing wear. The ball also strikes the seat a number of times during each stroke of the pump and this causes wear. As the amount of wear increases, the fluid seal between ball and seat is impaired and the action of the valve assembly becomes less and less satisfactory. The ball strikes the seat off center and chatters to place. Ultimately the valve assembly must be removed and replaced at very considerable cost.

The device of my invention forces the ball to move in a strictly vertical path, reduces the number as well as the severity of the blows which the ball inflicts on the seat, and eliminates the difficulties mentioned. It will be noted that the valve cage 13 surrounds the upper portion of the tubular member 15. The annular clearance is small, for instance $\frac{1}{64}$". The tubular member thus acts as a piston. When the ball rises, fluid within the tubular member above the ball is forced out of the valve cage through one or more restricted openings 18, located above the upper limit of motion of tubular member 15. The tubular member thus acts as a snubber or dash pot and the result is that the ball remains in contact with the tubular member during its rise and is thus prevented from chattering. When the action of the pump rods is reversed and the ball falls, the tubular member falls with it and remains in contact with the ball, since a partial vacuum is created within the upper part of the valve cage by the action of the falling ball and tubular member. Thus both while the ball is rising and while it is falling its motion is controlled by the tubular member, the ball is always centered in the cage, it strikes the seat around its full circumference at the same instant and chattering is prevented. Nevertheless, some independent action of the ball does take place, particularly toward the end of the downward path of the ball. The advantages of a ball valve are thus maintained since the position of the ball with respect to the seat changes slightly from stroke to stroke.

Tubular member 15 should have a length at least about twice the diameter of ball 11 and should have an outer diameter of from about 60% to about 90%, preferably about 75%, the diameter of ball 11.

The device is so designed that should the tubular member become stuck at its upper position due to the action of sand or some other foreign substance, the ball and seat will function as in the conventional type of pumping valve assembly:

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. A pumping valve assembly for use within a well, said pumping valve assembly comprising a ball valve member, a valve cage having at least one outlet port, a seat in said valve cage for said ball valve member, said ball valve member and said seat controlling an inlet port, and a tubular member formed at the bottom to engage said ball valve member and form a seal therewith, said tubular member being mounted above and normally resting upon said ball valve member, said tubular member having only a bearing clearance within said valve cage above said outlet port, said valve cage completely surrounding the upper end of said tubular member and having at least one restricted opening distinct from the clearance between said tubular member and said valve cage serving to connect the otherwise confined space above said ball valve member with the exterior of said valve cage.

2. A pumping valve assembly according to claim 1 in which said tubular member has an outer diameter of from about 60% to about 90% the diameter of said ball valve member.

3. A pumping valve assembly according to claim 1 in which said tubular member has an outer diameter of about 75% the diameter of said ball valve member.

4. A pumping valve assembly for use within a well, said pumping valve assembly comprising a ball valve member, a valve cage having outlet ports, a seat in said valve cage for said ball valve member, said ball valve member and said seat controlling an inlet port, and a tubular member closely fitted within said valve cage above said outlet ports, said tubular member being ground at the bottom to engage and form a seal with the upper part of said ball valve member and being mounted above said ball valve member within said valve cage, said valve cage completely surrounding the upper end of said tubular member and having a restricted opening above said tubular member serving to connect the otherwise confined space above said ball valve member with the exterior of said valve cage.

DONALD HARMON CRALL.